United States Patent
Davis, Jr. et al.

(10) Patent No.: US 10,077,694 B2
(45) Date of Patent: Sep. 18, 2018

(54) POWER GENERATION SYSTEM EXHAUST COOLING

(71) Applicant: General Electric Company, Schenectady, NY (US)

(72) Inventors: Lewis Berkley Davis, Jr., Niskayuna, NY (US); Parag Prakash Kulkarni, Niskayuna, NY (US); Robert Joseph Reed, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 505 days.

(21) Appl. No.: 14/753,102

(22) Filed: Jun. 29, 2015

(65) Prior Publication Data

US 2016/0376959 A1  Dec. 29, 2016

(51) Int. Cl.
*F02C 7/08* (2006.01)
*F01N 3/05* (2006.01)
(Continued)

(52) U.S. Cl.
CPC ............... *F01N 3/05* (2013.01); *F01D 25/30* (2013.01); *F01N 3/2066* (2013.01); *F02C 6/08* (2013.01);
(Continued)

(58) Field of Classification Search
CPC ........ F01D 25/305; F01N 3/05; F01N 3/2066; F02C 3/04; F02C 6/08; F02C 9/18; F05D 2220/32; F05D 2270/082
See application file for complete search history.

(56) References Cited

U.S. PATENT DOCUMENTS 3,677,012 A    7/1972  Batscha
3,922,850 A *  12/1975  McCabe ................... F02C 7/26
                                                        60/39.281
(Continued)

FOREIGN PATENT DOCUMENTS

CH         679236 A5    1/1992
EP       1 643 113 A2   4/2006
(Continued)

OTHER PUBLICATIONS

Reed et al., dated Jun. 29, 2015, U.S. Appl. No. 14/753,088.
(Continued)

*Primary Examiner* — Jesse Bogue
(74) *Attorney, Agent, or Firm* — Ernest G. Cusick; Hoffman Warnick LLC

(57) ABSTRACT

An airflow control system for a combined cycle turbomachine system according to an embodiment includes: an airflow generation system for attachment to a rotatable shaft of a gas turbine system, the airflow generation system drawing in an excess flow of air through an air intake section; a mixing area for receiving an exhaust gas stream produced by the gas turbine system; an air extraction system for extracting a first portion of the excess flow of air to provide bypass air, and for diverting the bypass air into the mixing area to reduce a temperature of the exhaust gas stream; diverting a second portion of the excess flow of air into the compressor component; and in response to an increase in a temperature of the air, increasing the second portion of the excess flow of air diverted into the compressor component.

13 Claims, 6 Drawing Sheets

(51) Int. Cl.
*F01N 3/20* (2006.01)
*F02C 6/08* (2006.01)
*F02C 6/18* (2006.01)
*F01D 25/30* (2006.01)
*F02K 1/38* (2006.01)
*F02K 3/06* (2006.01)
*F02C 7/18* (2006.01)

(52) U.S. Cl.
CPC .............. *F02C 6/18* (2013.01); *F02C 7/18* (2013.01); *F02K 1/386* (2013.01); *F02K 3/06* (2013.01); *F05D 2220/72* (2013.01); *F05D 2260/606* (2013.01); *Y02E 20/14* (2013.01); *Y02E 20/16* (2013.01)

(56) References Cited

U.S. PATENT DOCUMENTS

| | | | |
|---|---|---|---|
| 3,968,647 A | 7/1976 | Boudigues | |
| 3,998,047 A | 12/1976 | Walker | |
| 4,069,661 A * | 1/1978 | Rundell | F02K 3/075 |
| | | | 60/204 |
| 4,131,432 A | 12/1978 | Sato et al. | |
| 4,165,609 A | 8/1979 | Rudolph | |
| 4,183,210 A | 1/1980 | Snell | |
| 4,292,008 A | 9/1981 | Grosjean et al. | |
| 4,875,436 A | 10/1989 | Smith et al. | |
| 4,961,312 A * | 10/1990 | Simmons | F02C 7/18 |
| | | | 60/204 |
| 4,982,564 A | 1/1991 | Hines | |
| 5,014,508 A | 5/1991 | Lifka | |
| 5,113,649 A | 5/1992 | Siedlecki, Jr. | |
| 5,255,505 A | 10/1993 | Cloyd et al. | |
| 5,279,109 A | 1/1994 | Liu et al. | |
| 5,473,898 A | 12/1995 | Briesch | |
| 6,161,768 A | 12/2000 | Gordon et al. | |
| 6,250,061 B1 | 6/2001 | Orlando | |
| 6,612,114 B1 | 9/2003 | Klingels | |
| 6,786,034 B2 | 9/2004 | Liebig et al. | |
| 7,493,769 B2 | 2/2009 | Jangili | |
| 7,622,094 B2 | 11/2009 | Lewis et al. | |
| 7,730,714 B2 | 6/2010 | Wood et al. | |
| 7,966,825 B2 | 6/2011 | Judd | |
| 8,186,152 B2 | 5/2012 | Zhang et al. | |
| 8,261,528 B2 | 9/2012 | Chillar et al. | |
| 8,549,833 B2 | 10/2013 | Hyde et al. | |
| 2002/0124568 A1 | 9/2002 | Mikkelsen et al. | |
| 2003/0182944 A1 | 10/2003 | Hoffman et al. | |
| 2005/0150229 A1 | 7/2005 | Baer et al. | |
| 2005/0235649 A1* | 10/2005 | Baer | F02C 7/12 |
| | | | 60/772 |
| 2007/0101696 A1 | 5/2007 | Dooley | |
| 2007/0130952 A1 | 6/2007 | Copen | |
| 2008/0116054 A1 | 5/2008 | Leach et al. | |
| 2008/0253881 A1 | 10/2008 | Richards | |
| 2010/0024379 A1 | 2/2010 | Sengar et al. | |
| 2010/0064655 A1 | 3/2010 | Zhang et al. | |
| 2010/0107600 A1 | 5/2010 | Hillel et al. | |
| 2010/0215558 A1 | 8/2010 | Kraemer | |
| 2011/0030331 A1 | 2/2011 | Tong et al. | |
| 2011/0036066 A1 | 2/2011 | Zhang et al. | |
| 2011/0067385 A1 | 3/2011 | Hirata et al. | |
| 2011/0138771 A1 | 6/2011 | Feller et al. | |
| 2011/0158876 A1 | 6/2011 | Buzanowski et al. | |
| 2012/0171020 A1 | 7/2012 | Peck et al. | |
| 2013/0005237 A1* | 1/2013 | Baten | F02C 3/32 |
| | | | 454/252 |
| 2013/0025254 A1 | 1/2013 | Kurosaka et al. | |
| 2013/0031894 A1 | 2/2013 | Hodgson et al. | |
| 2013/0031910 A1 | 2/2013 | Merchant et al. | |
| 2013/0125557 A1 | 5/2013 | Scipio et al. | |
| 2013/0318941 A1 | 12/2013 | Ekanayake et al. | |
| 2013/0318965 A1 | 12/2013 | Ekanayake et al. | |
| 2013/0318984 A1* | 12/2013 | Ekanayake | F02C 6/12 |
| | | | 60/772 |
| 2013/0318987 A1* | 12/2013 | Ekanayake | F02C 6/00 |
| | | | 60/772 |
| 2013/0318997 A1* | 12/2013 | Conchieri | F02C 6/12 |
| | | | 60/783 |
| 2014/0090354 A1 | 4/2014 | Scipio et al. | |
| 2014/0150447 A1* | 6/2014 | Ekanayake | F01K 13/02 |
| | | | 60/778 |
| 2014/0165583 A1 | 6/2014 | Oliverio | |
| 2014/0208765 A1 | 7/2014 | Ekanayake et al. | |
| 2014/0230433 A1* | 8/2014 | Yacoub | F01N 3/106 |
| | | | 60/605.1 |
| 2014/0230444 A1 | 8/2014 | Hao et al. | |
| 2014/0234073 A1 | 8/2014 | Moreton et al. | |
| 2015/0047359 A1 | 2/2015 | Maguire et al. | |
| 2015/0089955 A1 | 4/2015 | Knapp et al. | |
| 2015/0121842 A1 | 5/2015 | Moes | |
| 2015/0143811 A1 | 5/2015 | Pang et al. | |
| 2015/0252683 A1 | 9/2015 | Hasting et al. | |
| 2016/0169119 A1 | 6/2016 | Musci et al. | |
| 2016/0201605 A1 | 7/2016 | Brandstein et al. | |
| 2016/0230658 A1 | 8/2016 | Hanlon et al. | |
| 2016/0326878 A1* | 11/2016 | Morimoto | F01D 5/081 |
| 2016/0348560 A1 | 12/2016 | Sato et al. | |
| 2016/0376908 A1 | 12/2016 | Reed et al. | |
| 2016/0376909 A1 | 12/2016 | Kulkarni et al. | |
| 2016/0376954 A1 | 12/2016 | Davis, Jr. et al. | |
| 2016/0376955 A1 | 12/2016 | Reed et al. | |
| 2016/0376956 A1 | 12/2016 | Kulkarni et al. | |
| 2016/0376957 A1 | 12/2016 | Kulkarni et al. | |
| 2016/0376958 A1 | 12/2016 | Davis, Jr. et al. | |
| 2016/0376959 A1 | 12/2016 | Davis, Jr. et al. | |
| 2016/0376960 A1 | 12/2016 | Reed et al. | |
| 2016/0376961 A1 | 12/2016 | Kulkarni et al. | |
| 2016/0376967 A1 | 12/2016 | Kulkarni et al. | |
| 2016/0376991 A1 | 12/2016 | Davis, Jr. et al. | |
| 2016/0376992 A1 | 12/2016 | Davis, Jr. et al. | |
| 2016/0376994 A1 | 12/2016 | Kulkarni et al. | |
| 2017/0342911 A1 | 11/2017 | Kulkarni et al. | |

FOREIGN PATENT DOCUMENTS

| | | |
|---|---|---|
| EP | 2 223 733 A1 | 9/2010 |
| EP | 2 615 265 A2 | 7/2013 |
| EP | 3 070 301 A1 | 9/2016 |
| GB | 774425 A | 5/1957 |
| JP | 2013124555 A | 6/2013 |
| WO | 2012/092215 A1 | 7/2012 |

OTHER PUBLICATIONS

Davis et al., dated Jun. 29, 2015, U.S. Appl. No. 14/753,064.
Davis et al., dated Jun. 29, 2015, U.S. Appl. No. 14/753,066.
Davis et al., dated Jun. 29, 2015, U.S. Appl. No. 14/753,072.
Kulkarni et al., dated Jun. 29, 2015, U.S. Appl. No. 14/753,073.
Kulkarni et al., dated Jun. 29, 2015, U.S. Appl. No. 14/753,074.
Reed et al., dated Jun. 29, 2015, U.S. Appl. No. 14/753,077.
Kulkarni et al., dated Jun. 29, 2015, U.S. Appl. No. 14/753,080.
Kulkarni et al., dated Jun. 29, 2015, U.S. Appl. No. 14/753,085.
Kulkarni et al., dated Jun. 29, 2015, U.S. Appl. No. 14/753,093.
Kulkarni et al., dated Jun. 29, 2015, U.S. Appl. No. 14/753,107.
Davis et al., dated Jun. 29, 2015, U.S. Appl. No. 14/753,097.
Reed et al., dated Jun. 29, 2015, U.S. Appl. No. 14/753,105.
U.S. Appl. No. 14/753,074, Office Action 1 dated Mar. 10, 2017, 41 pages.
U.S. Appl. No. 14/753,088, Office Action 1 dated Jun. 28, 2017, 37 pages.
U.S. Appl. No. 14/753,066, Notice of Allowance dated Jul. 13, 2017, 27 pages.
U.S. Appl. No. 14/753,072, Notice of Allowance dated Jul. 13, 2017, 28 pages.
U.S. Appl. No. 14/753,074, Notice of Allowance dated Sep. 18, 2017, 31 pages.
U.S. Appl. No. 14/753,064, Notice of Allowance dated Sep. 21, 2017, 10 pages.
U.S. Appl. No. 14/753,073, Office Action 1 dated Dec. 13, 2016, 16 pages.

(56) References Cited

OTHER PUBLICATIONS

U.S. Appl. No. 14/753,064, Office Action 1 dated Jan. 19, 2017, 24 pages.
U.S. Appl. No. 14/753,066, Office Action 1 dated Feb. 24, 2017, 33 pages.
U.S. Appl. No. 14/753,072, Office Action 1 dated Feb. 24, 2017, 34 pages.
U.S. Appl. No. 14/753,093, Office Action 1 dated Jun. 1, 2017, 40 pages.
U.S. Appl. No. 14/753,064, Final Office Action 1 dated Jun. 2, 2017, 31 pages.
U.S. Appl. No. 14/753,073, Final Office Action 1 dated Jun. 20, 2017, 28 pages.
Licata A., et al., "Viability of SCR on Simple Cycle Frame Gas Turbines," Licata Energy & Environmental Consultants, Inc., Yonkers, NY, Power Gen. 2014, Dec. 9-11, 2014, pp. 1-13.
"Turbofan," From Wikipedia, the free encyclopedia, Retrieved from the Internet URL: http://en.wikipedia.org/wiki/Turbofan, on Jan. 3, 2017, pp. 1-21.
Extended European Search Report and Opinion issued in connection with related EP Application No. 16176400.6 dated Nov. 14, 2016.
Extended European Search Report and Opinion issued in connection with related EP Application No. 16176128.3 dated Nov. 15, 2016.
Extended European Search Report and Opinion issued in connection with related EP Application No. 16175821.4 dated Nov. 16, 2016.
Extended European Search Report and Opinion issued in connection with related EP Application No. 16175335.5 dated Nov. 25, 2016.
Extended European Search Report and Opinion issued in connection with related EP Application No. 16176515.1 dated Nov. 28, 2016.
Extended European Search Report and Opinion issued in connection with related EP Application No. 16176652.2 dated Nov. 28, 2016.
Extended European Search Report and Opinion issued in connection with related EP Application No. 16175556.6 dated Nov. 28, 2016.
Extended European Search Report and Opinion issued in connection with related EP Application No. 16176514.4 dated Dec. 2, 2016.
Non-Final Rejection towards related U.S. Appl. No. 14/753,073 dated Dec. 13, 2016.
Chupka, Marc; "Independent Evaluation of SCR Systems for Frame-Type Combustion Turbines"; The Brattle Group; Anthony Licata, Licata Energy & Environmental Consulting, Inc.; Report for ICAP Demand Curve Reset; Prepared for New York Independent System Operator, Inc.; Nov. 1, 2013; 42 Pages.
Michael J. Reale, "New High Efficiency Simple Cycle Gas Turbine," General Electric Company, 2004, 20 pages. http://site.ge-energy.com/prod_serv/products/tech_docs/en/downloads/ger4222a.pdf.
U.S. Appl. No. 14/753,097, Office Action 1 dated Oct. 11, 2017, 53 pages.
U.S. Appl. No. 14/753,077, Office Action 1 dated Oct. 13, 2017, 54 pages.
U.S. Appl. No. 14/753,107, Office Action 1 dated Oct. 20, 2017, 52 pages.
U.S. Appl. No. 14/753,085, Notice of Allowance dated Oct. 19, 2017, 47 pages.
U.S. Appl. No. 14/753,088, Final Office Action 1 dated Oct. 19, 2017, 32 pages.
U.S. Appl. No. 14/753,093, Final Office Action 1 dated Nov. 1, 2017, 30 pages.
U.S. Appl. No. 14/753,080, Notice of Allowance dated Nov. 3, 2017, 48 pages.
U.S. Appl. No. 14/753,073, Office Action 2 dated Nov. 16, 2017, 35 pages.
U.S. Appl. No. 14/753,105, Office Action 1 dated Dec. 11, 2017, 67 pages.
U.S. Appl. No. 14/753,077, Final Office Action dated Jan. 12, 2018, 26 pages.
U.S. Appl. No. 14/753,097, Final Office Action dated Jan. 29, 2018, 27 pages.

\* cited by examiner

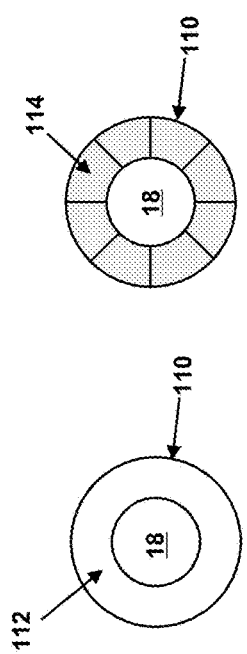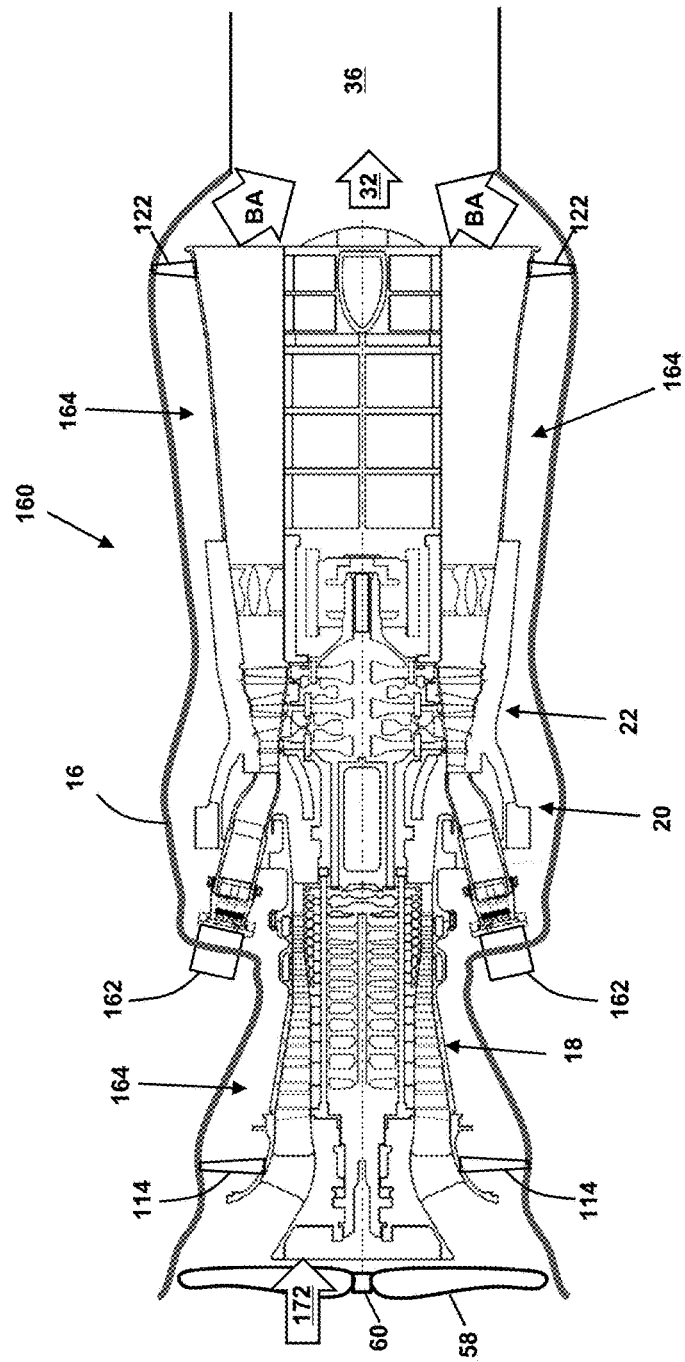

POWER GENERATION SYSTEM EXHAUST COOLING

CROSS-REFERENCE TO RELATED APPLICATIONS

This application is related to co-pending US application numbers: application Ser. No. 14/753,064, application Ser. No. 14/753,066, application Ser. No. 14/753,072, application Ser. No. 14/753,073, application Ser. No. 14/753,074, application Ser. No. 14/753,077, application Ser. No. 14/753,080, application Ser. No. 14/753,085, application Ser. No. 14/753,088, application Ser. No. 14/753,093, application Ser. No. 14/753,107, application Ser. No. 14/753,097, and application Ser. No. 14/753,105, all filed on Jun. 29, 2015.

BACKGROUND OF THE INVENTION

The disclosure relates generally to power generation systems, and more particularly, to systems and methods for cooling the exhaust gas of power generation systems.

Utility power producers use combined cycle (CC) power generation systems because of their inherent high efficiencies and installed cost advantage. CC power generation systems typically include a gas turbine, a heat recovery steam generator (HRSG), and a steam turbine. The heat recovery steam generator uses the hot exhaust gas from the gas turbine to create steam, which drives the steam turbine. The combination of a gas turbine and a steam turbine achieves greater efficiency than would be possible independently.

Operational flexibility to meet varying power grid demands at different times of the day is an important consideration in CC power generation systems. The issue becomes more important as intermittent energy sources such as solar and wind are integrated into the power grid. To this extent, CC power generation systems powered by fossil fuels must be capable of increasing/decreasing power output as required to accommodate such intermittent energy sources.

Non-steady state emissions from a CC power generation system (e.g., during start-up) are generally closely scrutinized by regulatory authorities. During start-up, emission control devices employing selective catalytic reduction (SCR) and carbon monoxide (CO) catalysts are not active. To avoid thermal stresses in the steam turbine, the gas turbine has to be held at a lower load to control the HRSG inlet temperature to around 700° F. Since emissions are higher at lower gas turbine loads and the emission control devices are not yet active, emissions during start-up can be an order of magnitude higher than those at steady state operation. Further, operating gas turbines at lower loads for a considerable amount of time reduces the power provided to the power grid during the crucial start-up period.

The efficiency and power output of gas turbines vary according to ambient conditions. The amount of these variations greatly affects electricity production, fuel consumption, and plant revenue. In general, the power output and efficiency of a gas turbine decrease as the ambient air temperature increases.

The power output of a gas turbine is directly proportional to and limited by the mass flow rate of compressed air provided by the compressor to the combustor of the gas turbine. The power output of a gas turbine decreases due to a reduction of the air mass flow rate delivered by the compressor to the combustor (the density of the air decreases as the ambient air temperature increases). Further, the efficiency of a gas turbine decreases because the compressor requires more power to compress air of higher temperature.

BRIEF DESCRIPTION OF THE INVENTION

A first aspect of the disclosure provides an airflow control system for a combined cycle turbomachine system, including: an airflow generation system for attachment to a rotatable shaft of a gas turbine system, the airflow generation system drawing in an excess flow of air through an air intake section; a mixing area for receiving an exhaust gas stream produced by the gas turbine system; an air extraction system for extracting a first portion of the excess flow of air to provide bypass air, and for diverting the bypass air into the mixing area to reduce a temperature of the exhaust gas stream; and an air regulation system for diverting a second portion of the excess flow of air into the compressor component and, in response to an increase in a temperature of the air drawn in through the air intake section, for increasing the second portion of the excess flow of air diverted into the compressor component.

A second aspect of the disclosure provides a turbomachine system, including: a gas turbine system including a compressor component, a combustor component, a turbine component, and a shaft driven by the turbine component; a fan selectively coupled to the shaft upstream of the gas turbine system, the fan drawing in an excess flow of air through an air intake section when coupled to the shaft; a mixing area for receiving an exhaust gas stream produced by the gas turbine system; an air extraction system for extracting a first portion of the excess flow of air to provide bypass air, and for diverting the bypass air into the mixing area to reduce a temperature of the exhaust gas stream; and an air regulation system for diverting a second portion of the excess flow of air into the compressor component and, in response to an increase in a temperature of the air drawn in through the air intake section, for increasing the second portion of the excess flow of air diverted into the compressor component; a heat recovery steam generator for receiving the reduced temperature exhaust gas stream and for generating steam; and a steam turbine system for receiving the steam generated by the heat recovery steam generator.

A third aspect of the disclosure provides a combined cycle power generation system, including: a gas turbine system including a compressor component, a combustor component, a turbine component, and a shaft driven by the turbine component; an electrical generator coupled to the shaft for generating electricity; a fan selectively coupled to the shaft upstream of the gas turbine system, the fan drawing in an excess flow of air through an air intake section when coupled to the shaft; a mixing area for receiving an exhaust gas stream produced by the gas turbine system; an air extraction system for extracting a first portion of the excess flow of air to provide bypass air, and for diverting the bypass air into the mixing area to reduce a temperature of the exhaust gas stream; and an air regulation system for diverting a second portion of the excess flow of air into the compressor component and, in response to an increase in a temperature of the air drawn in through the air intake section, for increasing the second portion of the excess flow of air diverted into the compressor component; a heat recovery steam generator for receiving the reduced temperature exhaust gas stream and for generating steam; and a steam turbine system for receiving the steam generated by the heat recovery steam generator.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawing that depicts various embodiments of the disclosure.

FIG. 5 is an illustrative cross-sectional view of the bypass enclosure and the compressor component of the CC power generation system taken along line A-A of FIG. 3.

FIG. 6 is an illustrative cross-sectional view of the bypass enclosure and the compressor component of the CC power generation system taken along line B-B of FIG. 4.

FIG. 7 depicts a schematic diagram of a CC power generation system according to embodiments.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure relates generally to power generation systems, and more particularly, to systems and methods for cooling the exhaust gas of power generation systems.

Figure 1:
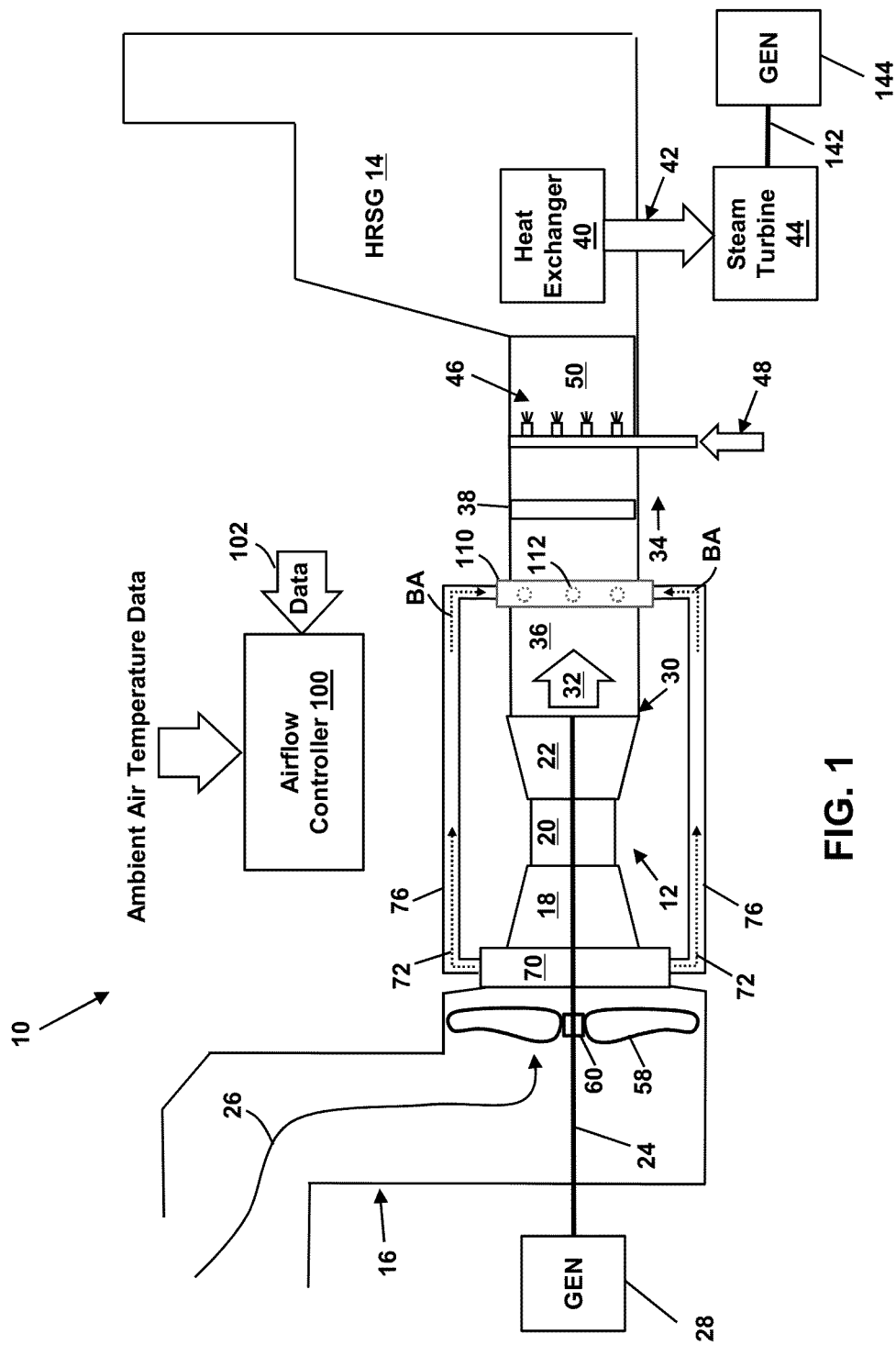
FIG. 1 shows a schematic diagram of a combined cycle (CC) power generation system according to embodiments.
Figure 3:
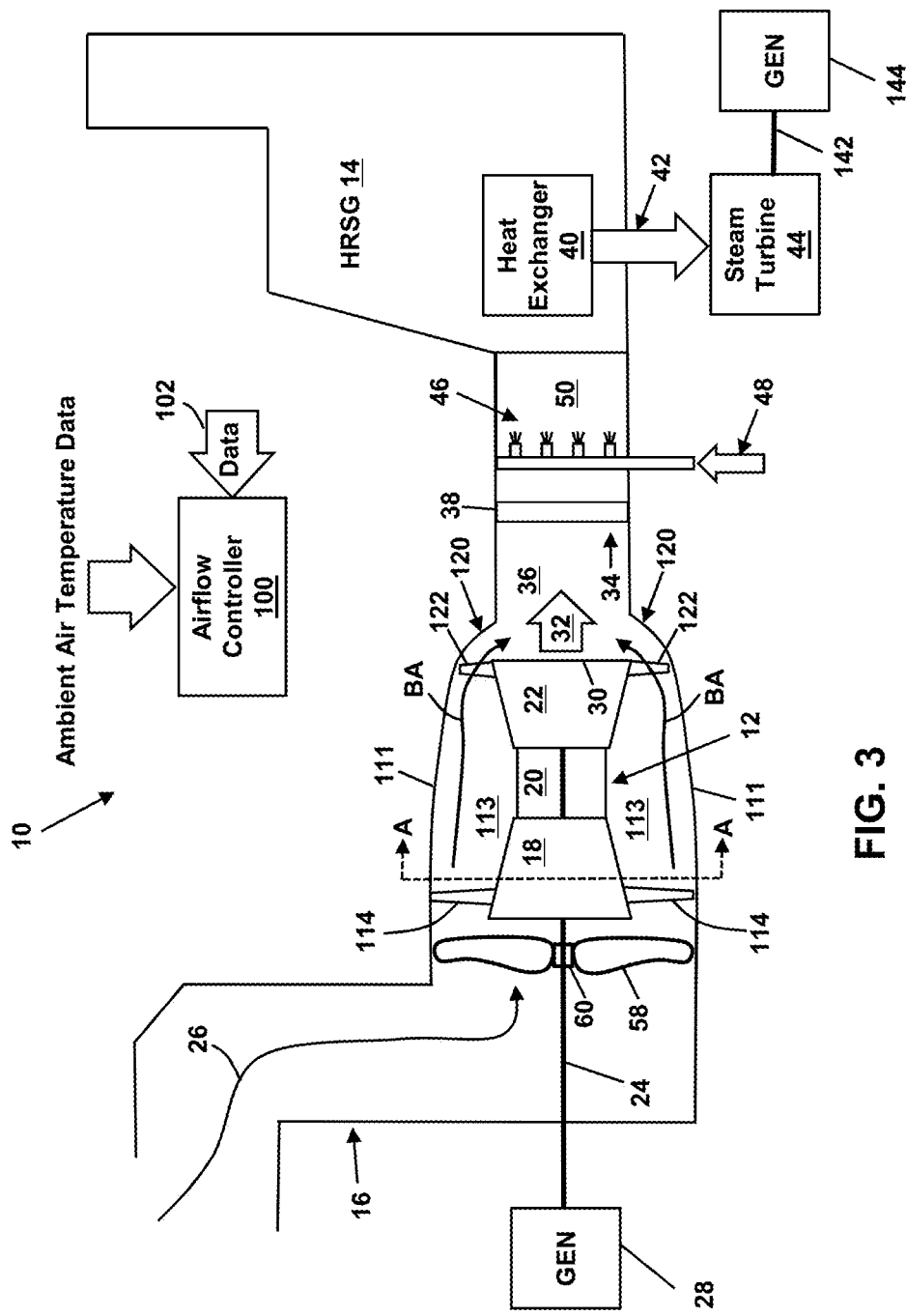
FIG. 3 shows a schematic diagram of a CC power generation system according to embodiments.

FIGS. 1 and 3 depict block diagrams of turbomachine systems (e.g., combined cycle (CC) power generation systems 10). According to embodiments, the CC power generation systems 10 each include a gas turbine system 12 and a heat recovery steam generator (HRSG system 14). The gas turbine system 12 may combust liquid or gas fuel, such as natural gas and/or a hydrogen-rich synthetic gas, to generate hot combustion gases to drive the gas turbine system 12.

The gas turbine system 12 includes an air intake section 16, a compressor component 18, a combustor component 20, and a turbine component 22. The turbine component 22 is drivingly coupled to the compressor component 18 via a shaft 24. In operation, air (e.g., ambient air) enters the gas turbine system 12 through the air intake section 16 (indicated by arrow 26) and is pressurized in the compressor component 18. The compressor component 18 includes at least one stage including a plurality of compressor blades coupled to the shaft 24. Rotation of the shaft 24 causes a corresponding rotation of the compressor blades, thereby drawing air into the compressor component 18 via the air intake section 16 and compressing the air prior to entry into the combustor component 20.

The combustor component 20 may include one or more combustors. In embodiments, a plurality of combustors are disposed in the combustor component 20 at multiple circumferential positions in a generally circular or annular configuration about the shaft 24. As compressed air exits the compressor component 18 and enters the combustor component 20, the compressed air is mixed with fuel for combustion within the combustor(s). For example, the combustor(s) may include one or more fuel nozzles that are configured to inject a fuel-air mixture into the combustor(s) in a suitable ratio for combustion, emissions control, fuel consumption, power output, and so forth. Combustion of the fuel-air mixture generates hot pressurized exhaust gases, which may then be utilized to drive one or more turbine stages (each having a plurality of turbine blades) within the turbine component 22.

In operation, the combustion gases flowing into and through the turbine component 22 flow against and between the turbine blades, thereby driving the turbine blades and, thus, the shaft 24 into rotation. In the turbine component 22, the energy of the combustion gases is converted into work, some of which is used to drive the compressor component 18 through the rotating shaft 24, with the remainder available for useful work to drive a load such as, but not limited to, an electrical generator 28 for producing electricity, and/or another turbine(s).

The combustion gases that flow through the turbine component 22 exit the downstream end 30 of the turbine component 22 as a stream of exhaust gas 32. The exhaust gas stream 32 flows in a downstream direction 34 into a mixing area 36 and toward/into the HRSG system 14.

The HRSG system 14 generally comprises a heat exchanger 40 that recovers heat from the exhaust gas stream 32 of the gas turbine system 12 to produce steam 42. The steam 42 may be used to drive one or more steam turbine systems 44. Each steam turbine system 44 may be coupled via a shaft 142 to one or more electrical generators 144 for producing electricity. The combination of the gas turbine system 12 and the steam turbine system 44 generally produces electricity more efficiently than either the gas turbine system 12 or steam turbine system 44 alone. The steam 42 generated by the HRSG system 14 may also be used in other processes, such as district heating or other process heating. In embodiments, the HRSG system 14 may further include a duct burner system 46 that is configured to burn fuel 48 (e.g., natural gas) in a combustion chamber 50 in order to increase the quantity and/or temperature of the steam 42 generated in the HRSG system 14.

As depicted in FIG. 1, an air generation system comprising, for example, a fan 58, may be coupled to the shaft 24 of the gas turbine system 12 upstream of the gas turbine system 12. The fan 58 may be used to draw in a supply of cooling air (e.g., ambient air) through the air intake section 16. In embodiments, at least a portion of the air drawn in by the fan 58 may be used to lower the temperature of the exhaust gas stream 32 and/or increase the flow of air into the compressor component 18.

The fan 58 may be coupled to the shaft 24 of the gas turbine system 12 using an on-off clutch 60 or other mechanism capable of coupling/decoupling the fan 58 to shaft 24. The fan 58 is configured to rotate at the same rotational speed as the shaft 24 when coupled to the shaft 24 by the on-off clutch 60. When decoupled from the shaft 24, the fan 58 does not rotate.

The compressor component 18 has a flow rate capacity and is configured to draw in a flow of air (e.g., ambient air) via the air intake section 16 based on its flow rate capacity. In operation, the fan 58, when coupled to the shaft 24 by the on-off clutch, is designed to draw in an additional flow of air through the air intake section 16 that is about 10% to about 40% of the flow rate capacity of the compressor component 18. In general, the percentage increase in the flow of air may be varied and selectively controlled based on several factors including the load on the gas turbine system 12, the temperature of the air being drawn into the gas turbine system 12, the temperature of the exhaust gas stream 32 at the HRSG system 14, etc.

Figure 2:
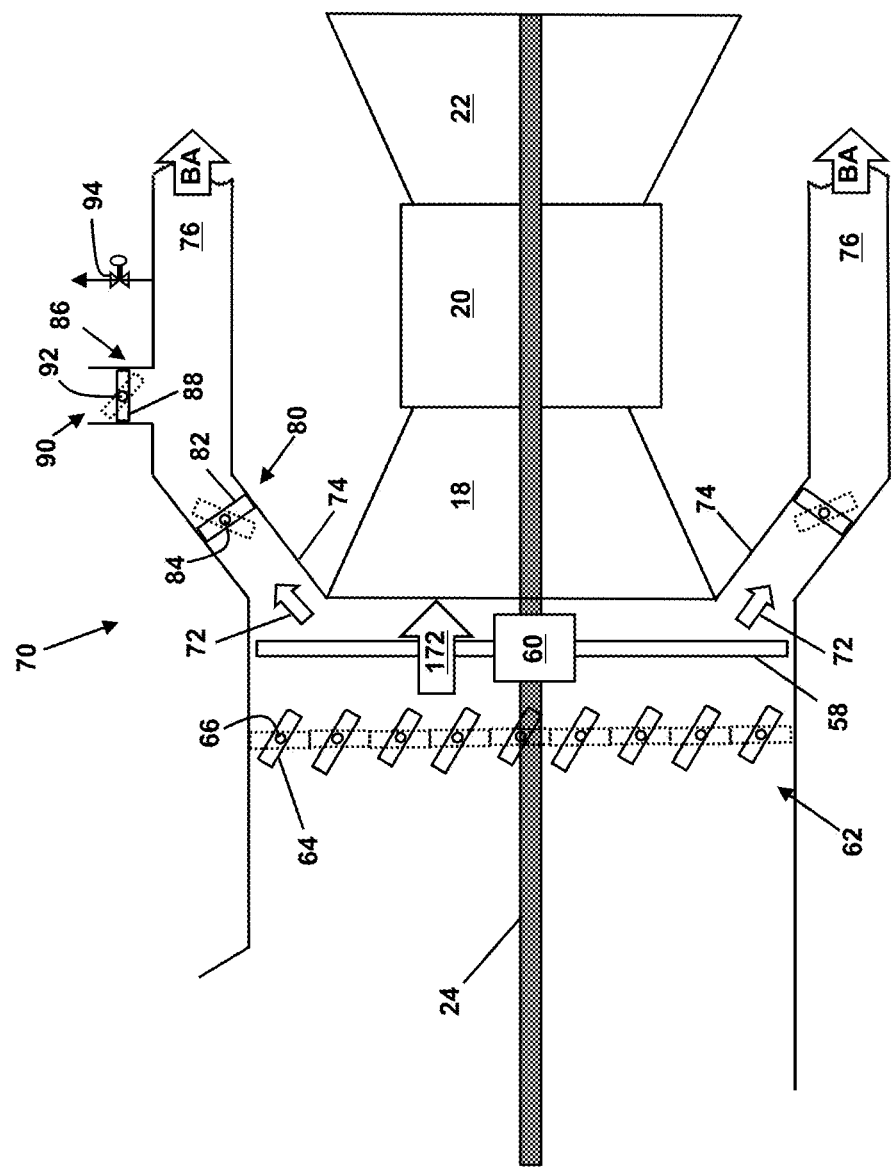
FIG. 2 depicts an enlarged view of a portion of the CC power generation system of FIG. 1 according to embodiments.

As depicted in FIG. 2, an inlet guide vane assembly 62 including a plurality of inlet guide vanes 64 may be used to control the amount of air available to the fan 58 and the compressor component 18. Each inlet guide vane 64 may be selectively controlled (e.g., rotated) by an independent actuator 66. Actuators 66 according to various embodiments are shown schematically in FIG. 2, but any known actuator may be utilized. For example, the actuators 66 may comprise an electro-mechanical motor, or any other type of suitable actuator.

The actuators 66 may be independently and/or collectively controlled in response to commands from an airflow controller 100 to selectively vary the positioning of the inlet guide vanes 64. That is, the inlet guide vanes 64 may be selectively rotated about a pivot axis by the actuators 66. In embodiments, each inlet guide vane 64 may be individually pivoted independently of any other inlet guide vane 64. In other embodiments, groups of inlet guide vanes 64 may be pivoted independently of other groups of inlet guide vanes 64 (i.e., pivoted in groups of two or more such that every inlet guide vane 64 in a group rotates together the same amount). Position information (e.g., as sensed by electro-mechanical sensors or the like) for each of the inlet guide vanes 64 may be provided to the airflow controller 100.

The increased flow of air provided by the fan 58, when coupled to the shaft 24 by the on-off clutch 60, may increase the air pressure at the compressor component 18. For example, in the case where the flow of air is increased by the fan 58 from about 10% to about 40% of the flow rate capacity of the compressor component 18, a corresponding pressure increase of about 5 to about 15 inches of water may be achieved. This pressure increase may be used to overcome pressure drop and facilitate proper mixing (described below) of cooler air with the exhaust gas stream 32 in the mixing area 36. The pressure increase may also be used to supercharge the gas turbine system 12.

Referring to FIGS. 1 and 2, an airflow regulation system 70 may be employed to extract at least some of the additional flow of air provided by the fan 58, when coupled to (and rotating with) the shaft 24 by the on-off clutch 60. A flow of air 72 may be extracted using, for example, one or more extraction ducts 74 (FIG. 2). The extracted air, or "bypass air" (BA) does not enter the gas turbine system 12, but is instead directed to the mixing area 36 through bypass ducts 76 as indicated by arrows BA, where the bypass air may be used to cool the exhaust gas stream 32. The remaining air (i.e., any portion of the additional flow of air generated by the fan 58 not extracted via the extraction ducts 74), hereafter referenced as air flow 172, enters the compressor component 18 of the gas turbine system 12 and flows through the gas turbine system 12 in a normal fashion. If the air flow 172 is greater than the flow rate capacity of the compressor component 18 of the gas turbine system 12, a supercharging of the gas turbine system 12 may occur, increasing the efficiency and power output of the gas turbine system 12.

The bypass air may be routed toward the mixing area 36 downstream of the turbine component 22 through one or more bypass ducts 76. The bypass air exits the bypass ducts 76 and enters the mixing area 36 through a bypass air injection grid 110 (FIG. 1), where the bypass air (e.g., ambient air) mixes with and cools the exhaust gas stream 32. In embodiments, the temperature of the exhaust gas stream 32 generated by the gas turbine system 12 is cooled by the bypass air from about 1100° F. to about 600° F.-1000° F. in the mixing area 36. The bypass air injection grid 110 may comprise, for example, a plurality of nozzles 112 or the like for directing (e.g., injecting) the bypass air into the mixing area 36. The nozzles 112 of the bypass air injection grid 110 may be distributed about the mixing area 36 in such a way as to maximize mixing of the bypass air and the exhaust gas stream 32 in the mixing area 36. The nozzles 112 of the bypass air injection grid 110 may be fixed in position and/or may be movable to selectively adjust the injection direction of bypass air into the mixing area 36.

A supplemental mixing system 38 (FIG. 1) may be positioned within the mixing area 36 to enhance the mixing process. The supplemental mixing system 38 may comprise, for example, a static mixer, baffles, and/or the like.

As depicted in FIG. 2, the air flow 72 flowing into each extraction duct 74 (and thus the air flow 172 entering the compressor component 18 of the gas turbine system 12) may be selectively controlled using a flow restriction system 80 comprising, for example, a damper 82, guide vane, or other device capable of selectively restricting airflow. Each damper 82 may be selectively controlled (e.g., rotated) by an independent actuator 84. The actuators 84 may comprise electro-mechanical motors, or any other type of suitable actuator. The dampers 82 may be independently and/or collectively controlled in response to commands from the airflow controller 100 to selectively vary the positioning of the dampers 82 such that a desired amount of bypass air is directed into the mixing area 36 via the bypass ducts 76 and a desired amount of air flow 172 is directed into the compressor component 18 of the gas turbine system 12 (e.g., to compensate for variations in the ambient air temperature). Position information (e.g., as sensed by electro-mechanical sensors or the like) for each of the dampers 82 may be provided to the airflow controller 100.

Bypass air may be selectively released from one or more of the bypass ducts 76 using an air release system 86 comprising, for example, one or more dampers 88 (or other devices capable of selectively restricting airflow, e.g. guide vanes) located in one or more air outlets 90. The position of a damper 88 within an air outlet 90 may be selectively controlled (e.g., rotated) by an independent actuator 92. The actuator 92 may comprise an electro-mechanical motor, or any other type of suitable actuator. Each damper 88 may be controlled in response to commands from the airflow controller 100 to selectively vary the positioning of the damper 88 such that a desired amount of bypass air may be released from a bypass duct 76. Position information (e.g., as sensed by electro-mechanical sensors or the like) for each damper 88 may be provided to the airflow controller 100. Further airflow control may be provided by releasing bypass air from one or more of the bypass ducts 76 through one or more metering valves 94 controlled via commands from the airflow controller 100.

The airflow controller 100 may be used to control the on-off clutch 60 to couple/decouple the fan 58 and shaft 24.

When the fan 58 is coupled to the shaft 24 by the on-off clutch 60, the airflow controller 100 may be used to vary the amount of air generated by the fan 58 that is diverted as bypass air through the bypass ducts 76 and into the mixing area 36 relative to the amount of air that enters the gas turbine system 12 (and exits as the exhaust gas stream 32). Air may be regulated, for example, to control the temperature of the exhaust gas stream 32 at the HRSG system 14. That is, the amount of bypass air flowing through the bypass ducts 76 into the mixing area 36 may be varied (e.g., under control of the airflow controller 100) as the temperature of the exhaust gas stream 32 changes, in order to regulate the temperature at the HRSG system 14. Air may also be regulated during start-up of the CC power generation system 10, during hot days, and/or during peak grid usage.

The air flow 172 produced by the fan 58 which enters the compressor component 18 of the gas turbine system 12 may be regulated by the airflow controller 100 in response to variations in the temperature of the ambient air provided via the air intake section 16. The airflow controller 100 may be configured to monitor the ambient air temperature or may be provided with data regarding the ambient air temperature.

In response to a variation in the ambient air temperature, the air flow 172 entering the compressor component 18 may be adjusted by rotating the dampers 82 of the flow restriction system 80 towards a more closed or more open position in response to commands from the airflow controller 100. For example, in response to an increase in the ambient air temperature (and corresponding decrease in air density), the dampers 82 of the flow restriction system 80 may be rotated towards a more closed position. This restricts and reduces the air flow 72 passing through the extraction ducts 74 into the bypass ducts 76 and increases the air flow 172 entering the compressor component 18 of the gas turbine 12. The increased air flow 172 entering the compressor component 18 compensates for the decrease in the air density.

In response to a decrease in the ambient air temperature and corresponding increase in air density, the dampers 82 of the flow restriction system 80 may be rotated towards a more open position. This increases the air flow 72 passing through the extraction ducts 74 into the bypass ducts 76 and decreases the air flow 172 entering the compressor component 18 of the gas turbine 12.

The airflow controller 100 may receive data 102 associated with the operation of the CC power generation system 10. Such data may include, for example, the temperature of the exhaust gas stream 32 as it enters the mixing area 36, the temperature of the exhaust gas stream 32 at the HRSG system 14 after mixing/cooling has occurred in the mixing area 36, the temperature and humidity of the air drawn into the air intake section 16 by the fan 58 (e.g., when coupled to the shaft 24 by the on-off clutch 60) and compressor component 18, and other temperature data obtained at various locations within the CC power generation system 10. The data 102 may further include airflow and pressure data obtained, for example, within the air intake section 16, at the inlet guide vanes 64, at the fan 58, at the entrance of the compressor component 18, within the extraction ducts 74, at the dampers 82, within the bypass ducts 76, at the downstream end 30 of the turbine component 22, and at various other locations within the CC power generation system 10. Load data, fuel consumption data, and other information associated with the operation of the gas turbine system 12 may also be provided to the airflow controller 100. The airflow controller 100 may further receive positional information associated with the inlet guide vanes 64, dampers 82, 88, valve 94, etc. It should be readily apparent to those skilled in the art how such data may be obtained (e.g., using appropriate sensors, feedback data, etc.), and further details regarding the obtaining of such data will not be provided herein.

Based on the received data 102, the airflow controller 100 is configured to couple/decouple the fan 58 to the shaft 24 using the on-off clutch 60. When the fan 58 is coupled to the shaft and is rotating therewith, the airflow controller 100 is configured to vary as needed: the amount of bypass air flowing through the bypass ducts 76 into the mixing area 36 to maintain the temperature at the HRSG system 14 at a suitable level; and the air flow 172 entering the compressor component 18 (e.g., in response to a variation in ambient air temperature). These actions may be achieved, for example, by varying at least one of: the flow of air drawn into the air intake section 16 by the fan 58 (this flow may be controlled, for example, by adjusting the position of one or more of the inlet guide vanes 64 and/or by increasing the rotational speed of the shaft 24); the flow of air 72 passing into the extraction ducts 74 (this flow may be controlled, for example, by adjusting the position of one or more of the dampers 82); the air flow 172 entering the compressor component 18 (this flow may be controlled, for example, by adjusting the position of one or more of the dampers 82); and the flow of bypass air passing from the extraction ducts 74, through the bypass ducts 76, into the mixing area 36 (this flow may be controlled, for example, by adjusting the position of one or more of the dampers 82, 88 and/or the operational status of the metering valves 94).

The airflow controller 100 may include a computer system having at least one processor that executes program code configured to control the amount of bypass air flowing through the bypass ducts 76 into the mixing area 36 and the air flow 172 entering the compressor component 18 of the gas turbine system 12 using, for example, data 102 and/or instructions from human operators. The commands generated by the airflow controller 100 may be used to control the operation of various components (e.g., such as on-off clutch 60, actuators 66, 84, 92, valve 94, and/or the like) in the CC power generation system 10. For example, the commands generated by the airflow controller 100 may be used to control the operation of the fan 58. Further, the commands may be used to control the operation of the actuators 66, 84, and 92 to control the rotational position of the inlet guide vanes 64, dampers 82, and dampers 88, respectively. Commands generated by the airflow controller 100 may also be used to activate other control settings in the CC power generation system 10.

Figure 4:
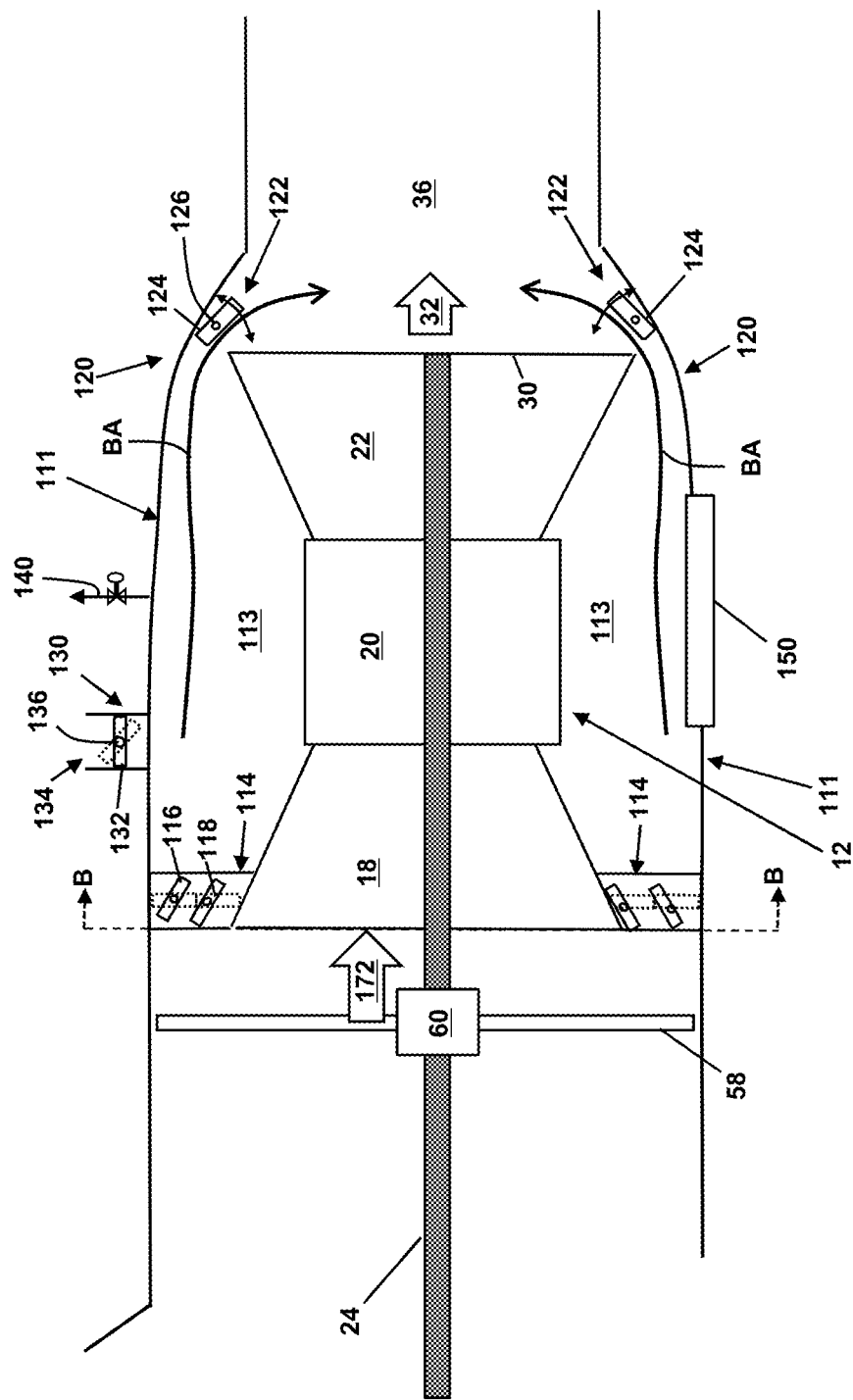
FIG. 4 depicts an enlarged view of a portion of the CC power generation system of FIG. 3 according to embodiments.

As depicted in FIGS. 3 and 4, instead of using external bypass ducts 76, the gas turbine system 12 may be surrounded by a bypass enclosure 111. The bypass enclosure 111 may extend from, and fluidly couple, the air intake section 16 to the mixing area 36. The bypass enclosure 111 may have any suitable configuration. For instance, the bypass enclosure 111 may have an annular configuration as depicted in FIG. 5, which is a cross-section taken along line A-A in FIG. 3. The bypass enclosure 111 forms an air passage 113 around the gas turbine system 12 through which a supply of cooling bypass air (BA) may be provided for cooling the exhaust gas stream 32 of the gas turbine system 12.

An airflow regulation system 114 may be provided to extract at least some of the additional flow of air provided by the fan 58, when coupled to the rotating shaft 24 by the clutch 60, and to direct the extracted air into the air passage 113 formed between the bypass enclosure 111 and the gas turbine system 12. The airflow regulation system 114 may comprise, for example, dampers, inlet guide vanes, a stator, or any other suitable system for selectively directing a flow of air into the air passage 113. In the following description, the airflow regulation system 114 comprises, but is not limited to, dampers. As shown in FIG. 6, which is a cross-section taken along line B-B in FIG. 4, the airflow regulation system 114 may extend completely around the entrance to the air passage 113 formed between the bypass enclosure 111 and the compressor component 18 of the gas turbine system 12.

As depicted in FIG. 4, the airflow regulation system 114 may include a plurality of dampers 116 for controlling: the amount of bypass air (BA) flowing into the air passage 113 formed between the bypass enclosure 111 and the gas turbine system 12; and the air flow 172 passing into the compressor component 18 of the gas turbine system 12. Each damper 116 may be selectively and independently controlled (e.g., rotated) by an independent actuator 118. The actuators 118 are shown schematically in FIG. 4, but any known actuator may be utilized. For example, the actuators 118 may comprise an electro-mechanical motor, or any other type of suitable actuator.

The actuators 118 of the airflow regulation system 114 may be independently and/or collectively controlled in response to commands from the airflow controller 100 to selectively vary the positioning of the dampers 116. That is, the dampers 116 may be selectively rotated about a pivot axis by the actuators 118. In embodiments, each damper 116 may be individually pivoted independently of any other damper 116. In other embodiments, groups of dampers 116 may be pivoted independently of other groups of dampers 116 (i.e., pivoted in groups of two or more such that every damper 116 in a group rotates together the same amount). Position information (e.g., as sensed by electro-mechanical sensors or the like) for each of the dampers 116 may be provided to the airflow controller 100.

The bypass air does not enter the gas turbine system 12, but is instead directed to the mixing area 36 through the air passage 113 as indicated by arrows BA, where the bypass air may be used to cool the exhaust gas stream 32. The remaining air (i.e., any portion of the additional flow of air generated by the fan 58 not extracted via the airflow regulation system 114 (e.g., air flow 172 in FIG. 4)) enters the compressor component 18 of the gas turbine system 12 and flows through the gas turbine system 12 in a normal fashion. If the flow of remaining air is greater than the flow rate capacity of the compressor component 18 of the gas turbine system 12, a supercharging of the gas turbine system 12 may occur, increasing the efficiency and power output of the gas turbine system 12.

The bypass air flows toward and into the mixing area 36 downstream of the turbine component 22 through the air passage 113. In embodiments, the bypass air exits the air passage 113 and is directed at an angle toward and into the exhaust gas stream 32 in the mixing area 36 to enhance mixing. In the mixing area 36, the bypass air (e.g., ambient air) mixes with and cools the exhaust gas stream 32 to a temperature suitable for use in the HRSG system 14. In embodiments, the temperature of the exhaust gas stream 32 generated by the gas turbine system 12 is cooled by the bypass air from about 1100° F. to about 600° F.-1000° F. in the mixing area 36.

As depicted in FIGS. 3 and 4, the distal end 120 of the bypass enclosure 111 may curve inwardly toward the mixing area 36 to direct the bypass air at an angle toward and into the exhaust gas stream 32 in the mixing area 36. The intersecting flows of the bypass air and the exhaust gas stream 32 may facilitate mixing, thereby enhancing the cooling of the exhaust gas stream 32. A flow directing system 122 may also be provided to direct the bypass air at an angle toward and into the exhaust gas stream 32. Such a flow directing system 122 may include, for example, outlet guide vanes, stators, nozzles, or any other suitable system for selectively directing the flow of bypass air into the mixing area 36.

An illustrative flow directing system 122 is shown in FIG. 4. In this example, the flow directing system 122 includes a plurality of outlet guide vanes 124. Each outlet guide vane 124 may be selectively controlled (e.g., rotated) by an independent actuator 126. The actuators 126 are shown schematically in FIG. 4, but any known actuator may be utilized. For example, the actuators 126 may comprise an electro-mechanical motor, or any other type of suitable actuator. In embodiments, the flow directing system 122 may extend completely around the exit of the air passage 113 formed between the bypass enclosure 111 and the turbine component 22 of the gas turbine system 12.

A supplemental mixing system 38 (FIG. 3) may be positioned within the mixing area 36 to enhance the mixing process. The supplemental mixing system 38 may comprise, for example, a static mixer, baffles, and/or the like.

As shown in FIG. 4, bypass air may be selectively released from the bypass enclosure 111 using an air release system 130 comprising, for example, one or more dampers 132 (or other devices capable of selectively restricting airflow, e.g. guide vanes) located in one or more air outlets 134. The position of a damper 132 within an air outlet 134 may be selectively controlled (e.g., rotated) by an independent actuator 136. The actuator 136 may comprise an electro-mechanical motor, or any other type of suitable actuator. Each damper 132 may be controlled in response to commands from the airflow controller 100 to selectively vary the positioning of the damper 132 such that a desired amount of bypass air may be released from the bypass enclosure 111. Position information (e.g., as sensed by electro-mechanical sensors or the like) for each damper 132 may be provided to the airflow controller 100. Further airflow control may be provided by releasing bypass air from the bypass enclosure 111 through one or more metering valves 140 (FIG. 4) controlled via commands from the airflow controller 100.

The airflow controller 100 may be used to control the on-off clutch 60 to couple/decouple the fan 58 and shaft 24. When the fan 58 is coupled to the shaft 24 by the on-off clutch 60, the airflow controller 100 may be used to vary the amount of air generated by the fan 58 that is diverted as bypass air into the mixing area 36 through the air passage 113 relative to the amount of air that enters the gas turbine system 12 (and exits as the exhaust gas stream 32) in order to control the temperature at the HRSG system 14 under varying operating conditions. The amount of bypass air flowing through the air passage 113 into the mixing area 36 may be varied (e.g., under control of the airflow controller 100) as the temperature of the exhaust gas stream 32 changes, in order to regulate the temperature at the HRSG system 14. Air may also be regulated during start-up of the CC power generation system 10, during hot days, and/or during peak grid usage.

According to embodiments, the air flow 172 produced by the rotating fan 58 and entering the compressor component 18 of the gas turbine system 12 may be regulated by the airflow controller 100 in response to variations in the temperature of the ambient air provided via the air intake section 16. The airflow controller 100 may be configured to monitor the ambient air temperature or may be provided with data regarding the ambient air temperature.

In response to a variation in the ambient air temperature, the air flow 172 entering the compressor component 18 may be adjusted by rotating the dampers 116 of the airflow regulation system 114 towards a more closed or more open position in response to commands from the airflow controller 100. For example, in response to an increase in the ambient air temperature (and corresponding decrease in air density), the dampers 116 of the airflow regulation system 114 may be rotated towards a more closed position. This restricts and reduces the air flow 72 passing through the extraction ducts 74 into the bypass ducts 76 and increases the air flow 172 entering the compressor component 18 of the gas turbine system 12. The increased air flow 172 entering the compressor component 18 compensates for the decrease in the air density.

In response to a decrease in the ambient air temperature and corresponding increase in air density, the dampers 116 of the airflow regulation system 114 may be rotated towards a more open position. This increases the air flow 72 passing through the extraction ducts 74 into the bypass ducts 76 and decreases the air flow 172 entering the compressor component 18 of the gas turbine 12.

As shown schematically in FIG. 4, the bypass enclosure 111 may be provided with one or more access doors 150. The access doors 150 provide access through the bypass enclosure 111 to the various components of the gas turbine system 12 (e.g., for servicing, repair, etc.).

In other embodiments, as depicted in FIG. 7, the gas turbine casing 160 itself can be used in lieu of the enclosure 111. This configuration operates similarly to the system depicted in FIGS. 3 and 4, except that the air regulation system 114 and flow directing system 122 are disposed within the gas turbine casing 160. The fuel/combustor inlets 162 of the combustor component 20 of the gas turbine system 12 may extend through the gas turbine casing 160 (e.g., for easier access). In this configuration, bypass air (BA) passes between the gas turbine casing 160 and the exterior of the compressor component 18, combustor component 20, and turbine component 22. Other components depicted in FIGS. 3 and 4, such as the air intake section, HRSG system, airflow controller, etc. are not shown for sake of clarity in FIG. 7.

In operation, a portion of the air drawn in by an air generation system (e.g., the fan 58, when coupled to the rotating shaft 24 by the on-off clutch 60) is directed by the air regulation system 114 as bypass air into an air passage 164 formed between the gas turbine casing 160 and the exterior of the compressor component 18, combustor component 20, and turbine component 22. The bypass air exits the air passage 164 and is directed at an angle by the flow directing system 122 toward and into the exhaust gas stream 32 in the mixing area 36. In the mixing area 36, the bypass air (e.g., ambient air) mixes with and cools the exhaust gas stream 32. The temperature of the exhaust gas stream 32 generated by the gas turbine system 12 may be cooled by the bypass air from about 1100° F. to about 600° F.-1000° F. in the mixing area 36. If necessary, in response to an increase in the ambient air temperature, the air flow 172 into the compressor component 18 may be increased by rotating the dampers of the air regulation system 114 towards a more closed position to restrict and reduce the flow of bypass air into the air passage 113. By increasing the air flow 172 passing into the compressor component 18 in response to an increase in the ambient air temperature, the power generated by the gas turbine system 12 increases.

As detailed above, the airflow controller 100 may receive a wide variety of data 102 associated with the operation of the CC power generation system 10 and the components thereof. Based on the received data 102, the airflow controller 100 is configured to couple/decouple the fan 58 to the shaft 24 using the on-off clutch 60. When the fan 58 is coupled to the shaft 24 and is rotating therewith, the airflow controller 100 is configured to vary as needed: the amount of bypass air flowing through the air passage 113, 164 into the mixing area 36 to regulate the temperature at the HRSG system 14; and the air flow 172 entering the compressor component 18 of the gas turbine system 12 (e.g., in response to a variation in ambient air temperature). These actions may be achieved, for example, by varying at least one of: the flow of air drawn into the air intake section 16 by the fan 58 and compressor component 18 of the gas turbine system 12; the flow of air directed into the air passage 113, 164 via the air regulation system 114 (this flow may be controlled, for example, by adjusting the position of one or more of the dampers 116); the air flow 172 passing into the compressor component 18 (this flow may be controlled, for example, by adjusting the position of one or more of the dampers 116); and the flow of bypass air through the air passage 113, 164 into the mixing area 36 (this flow may be controlled, for example, by adjusting the position of one or more of the dampers 116, 132 and/or the operational status of the metering valves 140).

Figure 8:
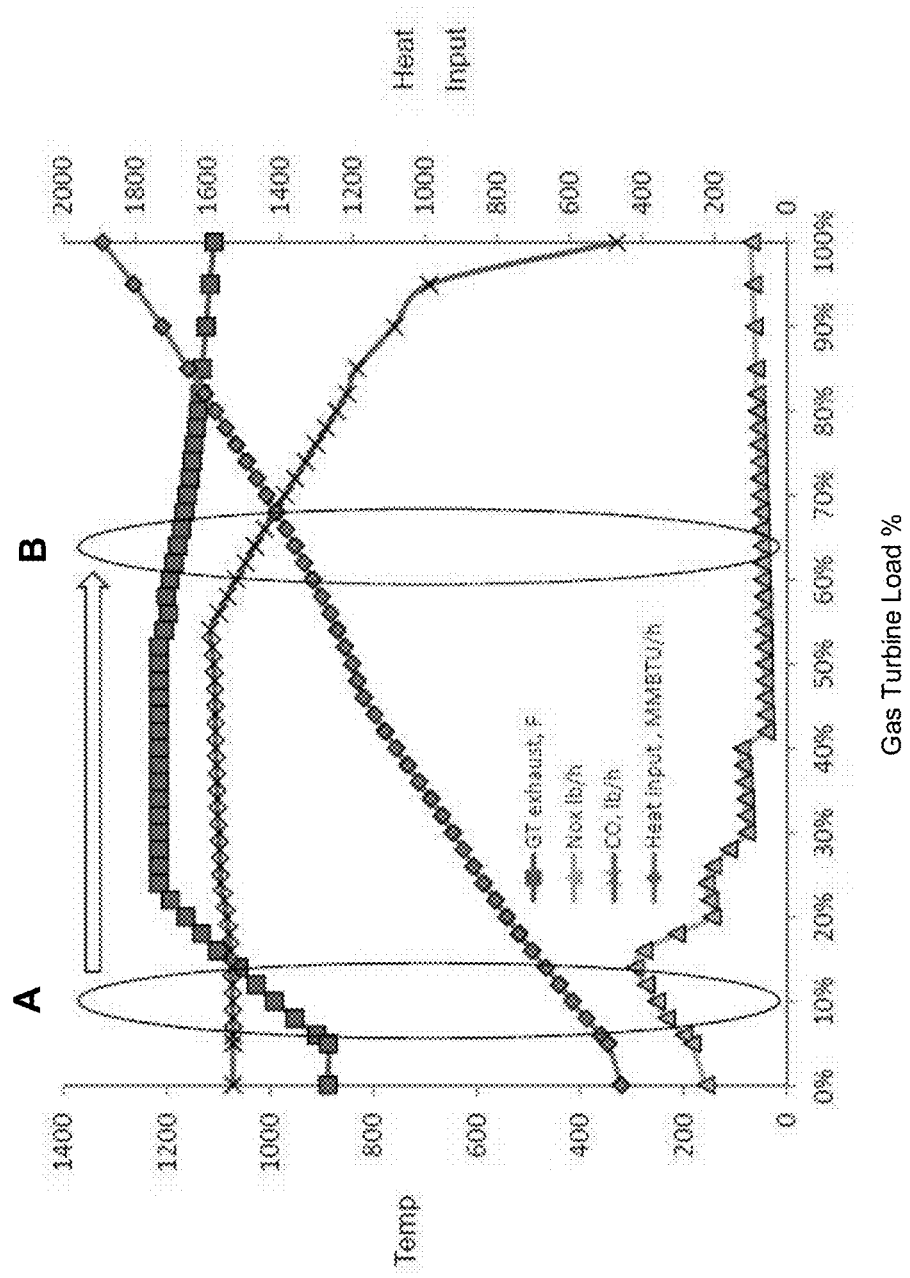
FIG. 8 is an illustrative chart depicting various operating conditions during a typical start-up process according to embodiments.

Examples of the start-up operation and the normal steady state operation of the CC power generation system 10 will now be provided with reference to FIGS. 1, 3, and 8.

Start-Up Operation

During a start-up process in a conventional CC power generation system, the gas turbine needs to be parked at a lower load (e.g., compared to the minimum emissions compliance load (MECL)), which results in higher $NO_x$ and CO emissions. This is done, for example, to maintain the temperature of the steam entering the steam turbine to around 700° F. to avoid thermal stresses in the steam turbine. This lower load is indicated by point "A" in FIG. 8.

In contrast, according to embodiments, in a CC power generation system 10 including a rotating fan 58 for generating bypass air for cooling an exhaust gas stream 32 of a gas turbine system 12, the gas turbine system 12 can be parked at a higher load (as indicated by point "B" in FIG. 8) with a higher exhaust temperature. At the higher exhaust temperature, the $NO_x$ and CO emissions in the exhaust gas stream 32 are lower. The temperature of the exhaust gas stream 32 of the gas turbine system 12 can be controlled using the bypass air (BA) to provide an inlet temperature of about 700° F. at the HRSG system 14. This results in lower start-up $NO_x$ and CO emissions and also helps to increase the power output of the gas turbine system 12 during start-up. Comparing point A and point B in FIG. 8, for example, it can easily be seen that the gas turbine system 12 can be operated (point B) at a higher temperature and higher load than a conventional gas turbine system (point A), while still providing an inlet temperature of about 700° F. at the HRSG system 14.

Normal Operation

During normal operation, assuming the fan 58 is coupled to the shaft 24 by the on-off clutch, a portion of the flow of air generated by the fan 58 may be used to supercharge the compressor component 18 of the gas turbine system 12, thereby boosting the power output of the gas turbine system 12. Further, the bypass air mixed back into the exhaust gas stream 32 of the gas turbine system 12 increases the flow into the HRSG system 14 and reduces the temperature of the flow. This allows increased firing in the duct system 46 without reaching the tube temperature limit of the HRSG system 14 (e.g., around 1600° F.). This also allows increased power output from the bottoming cycle of the CC power generation system 10. In embodiments, the power output of the CC power generation system 10 can be increased, for example, by 10 to 15% compared to the power output of a conventional CC power generation system (i.e., no fan).

In embodiments, several parameters can be regulated to control the power output of the CC power generation system 10, including:
1) the rotational status of the fan 58;
2) the amount of supercharging of the compressor component 18 of the gas turbine system 12;
3) the amount of bypass flow provided to the mixing area 36 to cool the exhaust gas stream 32;
4) the air flow 172 passing into the compressor component 18 in response to a change in the ambient air temperature to vary the power generated by the gas turbine system 12;
5) the ratio (i.e., "bypass ratio") of bypass flow versus flow into the gas turbine system 12 provided by the airflow regulation system 70;
6) the amount of firing of the duct burner system 46 (e.g., to move temperature of the exhaust gas flow to a target level after the bypass air has been injected into the exhaust gas stream 32); and
7) the amount of overfiring or underfiring of the gas turbine system 12 (to provide as much energy as feasible in the topping cycle).

Many advantages may be provided by the disclosed CC power generation system 10. For example, the power output of the gas turbine system 12 may be increased due to the supercharging of the inlet air to the compressor component 18 by the rotating fan 58. Further, high duct burner firing is possible without reaching the HRSG tube temperature limit, resulting in higher bottoming cycle power output. In addition, the gas turbine system 12 may be run during start-up at a higher load point. This results in lower emissions and an exhaust gas stream 32 having a temperature higher than that needed for the steam turbine system 44. Even further, quick adjustments can be made to compensate for changes in the ambient air temperature.

The use of an air generation system (such as fan 58) in lieu of conventional large external blower systems and/or other conventional cooling structures provides many other advantages. For example, the need for redundant external blower systems and associated components (e.g., blowers, motors and associated air intake structures, filters, ducts, etc.) required by conventional exhaust stream cooling systems is eliminated. This reduces manufacturing and operating costs, as well as the overall footprint, of the CC power generation system 10. The footprint is further reduced as the fan 58 draw in air through an existing air intake section 16, rather than through separate, dedicated intake structures often used with external blower systems.

Use of the fan 58 provides a more reliable and efficient CC power generation system 10. For example, since the bypass air used for cooling in the mixing area 36 is driven by the shaft 24 of the gas turbine system 12 itself, large external blower systems are no longer required. Further, at least a portion of the flow of air generated by the fan 58 may be used to supercharge the gas turbine system 12.

Power requirements of the CC power generation system 10 are reduced because the fan 58 is coupled to, and driven by, the shaft 24 of the gas turbine system 12. This configuration eliminates the need for large blower motors commonly used in conventional external blower cooling systems.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to" or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airflow control system for a combined cycle turbomachine system, comprising:
    an airflow generation system for attachment to a rotatable shaft of a gas turbine system, the airflow generation system drawing in an excess flow of air through an air intake section, the gas turbine system including a compressor component, a combustor component, and a turbine component;
    a mixing area for receiving an exhaust gas stream produced by the gas turbine system;
    a temperature sensor for providing a temperature of the air drawn in through the air intake section;
    an airflow controller, coupled to the temperature sensor, for receiving and determining changes in the temperature of the air drawn in through the air intake section;

an air extraction system for:
  extracting a first portion of the excess flow of air to provide bypass air, and for diverting the bypass air into the mixing area to reduce a temperature of the exhaust gas stream; and
  diverting a second portion of the excess flow of air directly into the compressor component and, in response to the airflow controller determining an increase in the temperature of the air drawn in through the air intake section, for increasing the second portion of the excess flow of air diverted directly into the compressor component;
wherein the air extraction system further includes:
  a bypass duct for diverting the bypass air completely around the compressor component, the combustor component, and the turbine component of the gas turbine system into the mixing area to reduce the temperature of the exhaust gas stream; and
  a damper system, controlled by the airflow controller, for selectively controlling the flow of bypass air flowing through the bypass duct based on the temperature of the air drawn in through the air intake section.

2. The airflow control system of claim 1, wherein the air extraction system is further configured, in response to the airflow controller determining an increase in the temperature of the air drawn in through the air intake section, to decrease the bypass air diverted into the mixing area by controlling the damper system.

3. The airflow control system of claim 1, wherein the excess flow of air drawn in by the airflow generation system comprises 10 percent to 40 percent of a flow of air drawn in by a compressor component of the gas turbine system.

4. The airflow control system of claim 1, wherein the airflow generation system comprises a fan.

5. The airflow control system of claim 1, further comprising a heat recovery steam generator for receiving the reduced temperature exhaust gas stream and for generating steam.

6. The airflow control system of claim 5, further comprising a duct burner system upstream of the heat recovery steam generator for heating the reduced temperature exhaust gas stream.

7. The airflow control system of claim 4, wherein the fan is selectively coupled to the shaft using an on-off clutch.

8. A turbomachine system, comprising:
  a gas turbine system including a compressor component, a combustor component, a turbine component, and a shaft driven by the turbine component;
  a fan selectively coupled to the shaft upstream of the gas turbine system, the fan drawing in an excess flow of air through an air intake section when coupled to the shaft;
  a mixing area for receiving an exhaust gas stream produced by the gas turbine system;
  a temperature sensor for providing a temperature of the air drawn in through the air intake section;
  an airflow controller, coupled to the temperature sensor, for receiving and determining changes in the temperature of the air drawn in through the air intake section;
  an air extraction system for:
    extracting a first portion of the excess flow of air to provide bypass air, and for diverting the bypass air into the mixing area to reduce a temperature of the exhaust gas stream; and
    diverting a second portion of the excess flow of air directly into the compressor component and, in response to the airflow controller determining an increase in the temperature of the air drawn in through the air intake section, for increasing the second portion of the excess flow of air directly diverted into the compressor component;
  wherein the air extraction system further includes:
    a bypass duct for diverting the bypass air completely around the compressor component, the combustor component, and the turbine component of the gas turbine system into the mixing area to reduce the temperature of the exhaust gas stream; and
    a damper system, controlled by the airflow controller, for selectively controlling the flow of bypass air flowing through the bypass duct based on the temperature of the air drawn in through the air intake section;
    a heat recovery steam generator for receiving the reduced temperature exhaust gas stream and for generating steam; and
    a steam turbine system for receiving the steam generated by the heat recovery steam generator.

9. The turbomachine system of claim 8, wherein the air extraction system is further configured, in response to the airflow controller determining an increase in the temperature of the air drawn in through the air intake section, to decrease the bypass air diverted into the mixing area by controlling the damper system.

10. The turbomachine system of claim 8, wherein the excess flow of air drawn in by the airflow generation system comprises 10 percent to 40 percent of a flow of air drawn in by the compressor component of the gas turbine system.

11. The turbomachine system of claim 8, wherein the fan is selectively coupled to the shaft using an on-off clutch.

12. The turbomachine system of claim 8, further comprising a duct burner system upstream of the heat recovery steam generator for heating the reduced temperature exhaust gas stream.

13. A combined cycle power generation system, comprising:
  a gas turbine system including a compressor component, a combustor component, a turbine component, and a shaft driven by the turbine component;
  an electrical generator coupled to the shaft for generating electricity;
  a fan selectively coupled to the shaft upstream of the gas turbine system, the fan drawing in an excess flow of air through an air intake section when coupled to the shaft;
  a mixing area for receiving an exhaust gas stream produced by the gas turbine system;
  a temperature sensor for providing a temperature of the air drawn in through the air intake section;
  an airflow controller, coupled to the temperature sensor, for receiving and determining changes in the temperature of the air drawn in through the air intake section;
  an air extraction system for:
    extracting a first portion of the excess flow of air to provide bypass air, and for diverting the bypass air into the mixing area to reduce a temperature of the exhaust gas stream; and
    diverting a second portion of the excess flow of air directly into the compressor component and, in response to the airflow controller determining an increase in the temperature of the air drawn in through the air intake section, for increasing the second portion of the excess flow of air directly diverted into the compressor component;
  wherein the air extraction system further includes:

a bypass duct for diverting the bypass air completely around the compressor component, the combustor component, and the turbine component of the gas turbine system into the mixing area to reduce the temperature of the exhaust gas stream; and a damper system, controlled by the airflow controller, for selectively controlling the flow of bypass air flowing through the bypass duct based on the temperature of the air drawn in through the air intake section;

a heat recovery steam generator for receiving the reduced temperature exhaust gas stream and for generating steam; and a steam turbine system for receiving the steam generated by the heat recovery steam generator.

* * * * *